United States Patent Office 3,446,749
Patented May 27, 1969

3,446,749
PREPARATION OF A WATER-INSOLUBLE METAL SOAP PRILL CONTAINING A MIXTURE OF TWO BIVALENT METAL SOAPS
Lewis B. Weisfeld, Highland Park, and Stanley E. Whitehead, New Brunswick, N.J., assignors to Carlisle Chemical Works, Inc., Reading, Ohio, a corporation of Ohio
No Drawing. Filed June 14, 1965, Ser. No. 463,943
Int. Cl. C08k 1/58; B01j 2/06
U.S. Cl. 252—400          7 Claims

ABSTRACT OF THE DISCLOSURE

A prilled soap mixture of at least two bivalent metals is precipitated by reacting the hydroxide of one such metal with an oil-in-water suspension of droplets which consist of a molten soap of another metal and the molten acid forming said soap; the metal of the hydroxide reactant must form a soap which has a higher melting point than the added molten soap.

This invention relates to the preparation of binary mixtures of water insoluble soaps and more particularly of such mixtures which contain soaps of two different metals of the second group of the periodic system.

Mixtures of soaps or salts of organic acids are used in various arts, for instance as stabilizers for polymers, such as vinyl chloride or vinylidene chloride resins, where it has been found that the different metals have a synergistic action. Generally, it is desirable to employ the metal components of such mixed soaps in predetermined proportions; the only process available heretofore to ensure a desired metal to metal ratio throughout the entire production, was the double decomposition process in which the soaps of two or more metals were coprecipitated by adding an aqueous solution of an alkali metal soap to an aqueous solution of metal salts, for instance nitrates or chlorides, containing the ions of the various metals in the proportion required in the final precipitated soap mixture of said metals.

It is a serious drawback of said conventional procedure that the precipitated soap mixture occludes alkali metal salt, and that elaborate washing and drying steps are necessary to remove said impurities, which render the process quite costly.

We have now found a new method of preparing mixed soaps of metals of the second group of the periodic system which avoids the disadvantages of the double decomposition procedure and is suitable for preparing mixtures containing different metals in exact proportions whereby said exact proportion is ensured for every single particle of a batch.

Our method consists in preparing an emulsion of droplets of a molten metal soap containing a predetermined excess of the acid in an aqueous medium and react it therein with an oxide or hydroxide of one or more other metals, thereby precipitating a mixture of the metal soaps. It will be readily seen that by suitable adjustment of the proportions of free acid and metal soap in the melt forming the oil droplets in the aqueous phase, and of the proportions of oxides or hydroxides of one or more other metals, any desired ratio of two or more metals in the final mixture can easily be attained. The particle size of the precipitate is related to the original size of the oil droplets of the melt in the aqueous phase, which in turn, is a function of the speed of agitation, and the amount of metal hydroxide in solution. Thus, it is possible to control the size of the obtained soap prills, whereby the particle size is the larger, the closer the reactant are to stoichiometric proportions.

However, in order to prevent coalescence of droplets of the soap-acid melt, the environment of the droplets should always have at least a slight excess of the base (metal oxide or hydroxide), and we prefer to use an excess of metal hydroxide of at least 5 molar percent over the free acid. Generally, such excess is about 10 to 25 mole percent.

The particle size of the forming prill can be further controlled or adjusted by the addition of small amounts of surface active agents to the aqueous phase. Also small amounts of polyvinyl alcohol have a similar effect.

The temperature of the reaction must be such as to ensure that the suspended soap-acid blend is in the molten state. For practical purposes, it may range from room temperature to the boiling point of the solution.

Any substantially water insoluble acid can be employed. Our process is particularly suitable for the preparation of mixed metal soaps of unsubstituted saturated fatty acids containing at least eight carbon atoms such as caprylic, lauric, stearic, myristic acid. Also aliphatic substituted or unsaturated monocarboxylic acids such as e.g. p-tertiary butyl benzoic acid, hydroxy stearic and hydroxy lauric acid can be employed, always provided that they form insoluble soaps with bivalent metals.

As stated above, we prefer to use for the oil phase a mixture containing a metal soap of low melting point and the respective acid in predetermined amounts, whereby it is easy to prepare such mixture by the fusion process. The other metal soap, which is to be associated with said first metal soap, is preferably the soap of a metal forming high melting soaps, i.e. soaps which are not readily produced by the fusion process. To give practical examples: Relatively low melting soaps of metals of the second group of the periodic system are essentially the zinc and cadmium soaps; therefore, it is these soaps which will be prepared by the fusion process and then applied with an excess of acid in the oil phase. High melting soaps are e.g. the calcium and barium soaps, and calcium and/or barium will therefore be applied as hydroxides in aqueous solutions.

The melting point of the metal soaps increases generally in the order magnesium-cadmium-zinc-calcium-barium, and in soaps of the same metal, the melting point increases generally with the number of carbon atoms in homologous series of acids. Some representative melting points of laurates and stearates are given below:

|  | ° C. |
|---|---|
| Magnesium stearate | 88.5 |
| Cadmium laurate | 98–99 |
| Cadmium stearate | 108–110 |
| Zinc laurate | 110 |
| Zinc stearate | 115–125 |
| Calcium laurate | 182–183 |
| Calcium stearate | 179–180 |
| Barium laurate | 235 |
| Barium stearate | 235 |

In the preparation of mixture of any two soaps of such series, the soap-acid mixture will always be added to a solution or suspension of the metal oxide or hydroxide listed farther down in such list. In the above list, the mixed soap-acid media from magnesium through zinc are all molten in the water phase below the boiling point of water.

As it is well known that barium and calcium soaps cannot be prepared by a conventional fusion process, it will be readily recognized that our process presents an easy way to incorporate such soaps into lower melting soaps.

The invention will be further illustrated by the following examples:

Example 1.—Preparation of barium-cadmium laurate

18.3 g. of cadmium oxide were digested at 160° C. with 147.6 g. of lauric acid until the brownish color of cadmium oxide had disappeared.

At the same time, 114 g. of barium oxide were dissolved with stirring as barium hydroxide in 1500 g. of water at 60° C.

From said solution, an aliquot of 520 g. containing 44.2 g. of barium hydroxide was taken, and said cadmium laurate melt having a temperature of 120° C. was slowly poured into said batch with vigorous stirring within 15 minutes.

Barium-cadmium laurate as a uniform prill of about 1 mm. diameter was precipitated, and the precipitate was filtered and washed once with fresh water.

There were obtained 185.5 g. of dry mixed soap in a yield of 95.5 percent, calculated on cadmium and acid change. The product had a uniform ratio of 14.65% of barium and 8.77% of cadmium.

Example 2.—Preparation of barium-zinc stearate

20 grams of zinc oxide (0.246 mole) were fused with 268 grams of vegetable grade stearic acid, acid value 205 (0.979 mole) at 145–150° C. The clear, fused mass was slowly poured into an agitated aqueous solution/suspension of 38 grams of barium oxide (0.248 mole) in 500 ml. of water. A prill separated, while the solution was kept in agitation for one hour. On drying, the material analyzed for 9.85% barium and 5.65% zinc (theory 10.2% and 5.1% respectively). The dried yield was 315 grams.

Example 3.—Preparation of calcium-zinc stearate

14.05 grams of zinc oxide (0.172 mole) were fused with 290 grams of stearic acid, acid value 205 (1.06 moles) at 145–150° C. This clear, non-viscous melt was poured slowly into a slurry of 20.4 grams of calcium oxide (0.364 mole) in 1000 ml. of water. The prill which separated was filtered, dried and analyzed, found to contain 4.60% calcium (4.38% theory) and 3.55% zinc (3.6% theory). Total yield was 315 grams.

Example 4.—Preparation of barium-cadmium stearate

12.8 grams of cadmium oxide (0.10 mole) were digested in 146.3 grams of the 205 A.V. stearic acid (0.53 mole) at 150–160° C., then poured slowly into the rapidly agitated solution/suspension of 25.2 grams of barium oxide (0.164 mole) in 500 ml. of water. The dried prilled product had a uniform analysis of 11.25% barium and 5.7% cadmium.

Though the examples illustrate only the preparation of binary soap mixtures, it will be understood that the same procedure can be extended to prepare ternary mixtures. Our process may also be used to incorporate soaps of other metals such as lead or other metals by pouring a melt of one of the metal soaps recited hereinabove with the respective acid into a suspension of a lead or other suitable metal oxide.

We claim:

1. A method of preparing directly prills consisting of a mixture of water insoluble soaps of at least two bivalent metals of the group consisting of magnesium, calcium, barium, strontium, zinc, and cadmium, comprising introducing droplets of a material consisting essentially of a molten substantially water insoluble organic acid selected from the group consisting of unsubstituted and hydroxy substituted fatty acids and aromatic carboxylic acids and a salt of said acid with at least one metal of said group, into an aqueous medium containing the hydroxide of at least one other metal of said group, said other metal forming a salt with said acid which has a higher melting point than the corresponding salt of said first metal, said aqueous medium having at least a slight excess of said hydroxide over said organic acid, thereby precipitating prills containing a mixture of salts of all said metals, each prill containing approximately the same proportion of one metal soap to another and separating said prills from the aqueous medium.

2. The method as claimed in claim 1 wherein said hydroxide is in an excess of at least 5 mole percent.

3. The method according to claim 2 wherein said organic acid is a fatty acid having 8 to 18 carbon atoms, said material contains a cadmium salt of said acid and said aqueous medium contains barium hydroxide.

4. The method according to claim 2 wherein said material consists essentially of lauric acid and cadium laurate and said hydroxide is barium hydroxide.

5. The method according to claim 2 wherein said material consists essentially of stearic acid and zinc stearate and said hydroxide is barium hydroxide.

6. The method according to claim 2 wherein said material consists essentially of stearic acid and zinc stearate and said hydroxide is calcium hydroxide.

7. The method according to claim 2 wherein said material consists essentially of stearic acid and cadmium stearate and said hydroxide is barium hydroxide.

References Cited

UNITED STATES PATENTS 2,695,910  11/1954  Asseff et al. _____ 252—36 X

LEON D. ROSDOL, *Primary Examiner.*

I. GLUCK, *Assistant Examiner.*

U.S. Cl. X.R.

252—33.6, 36, 39, 397, 407; 260—414